United States Patent Office 3,198,034
Patented Aug. 3, 1965

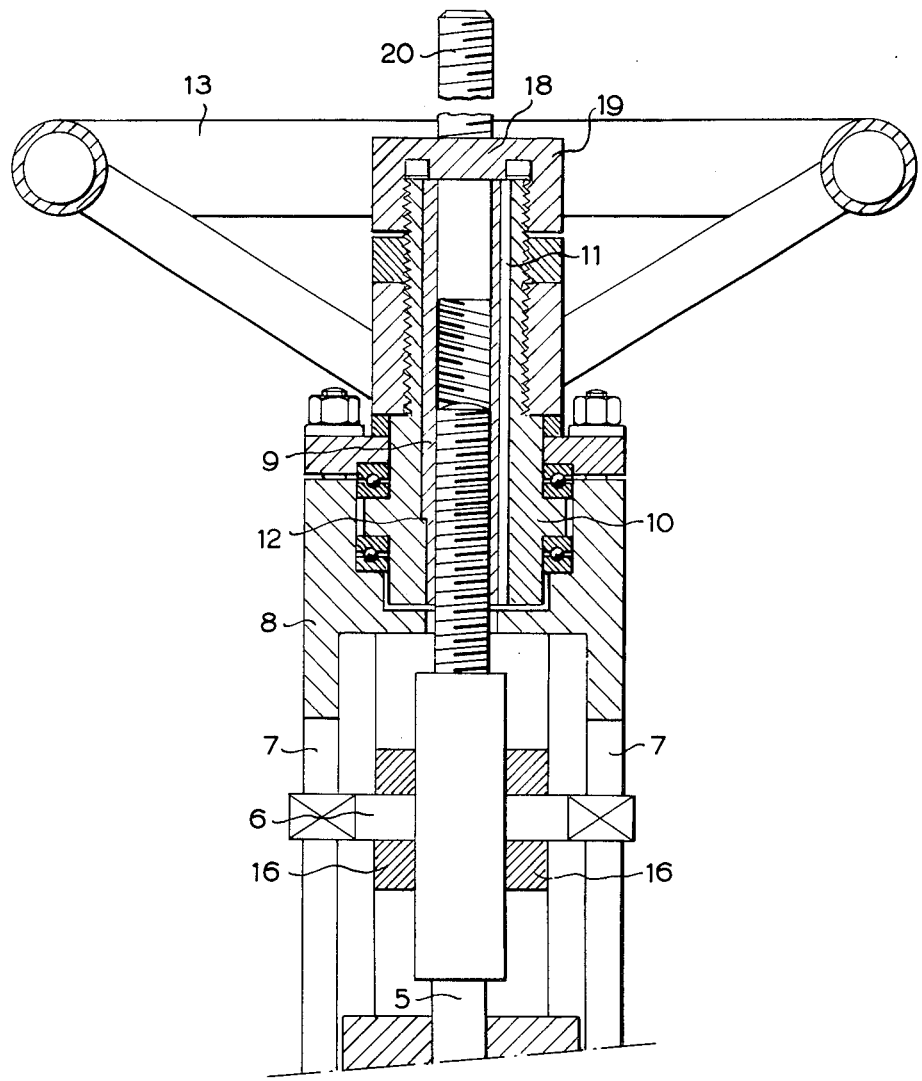

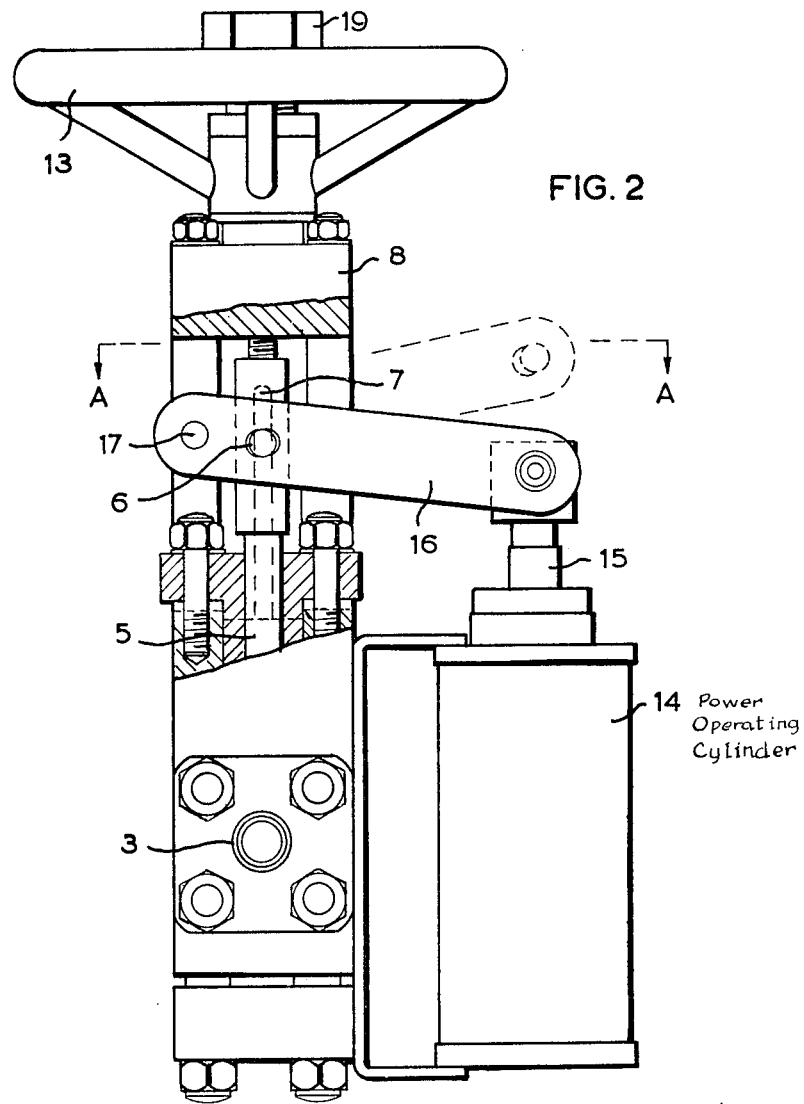

3,198,034
VALVE ACTUATOR
Jacobus C. M. de Witte, Beek, and Andreas J. H. Goedhart, Sittard, Netherlands, assignors to Stamicarbon N.V., Heerlen, Netherlands
Filed May 7, 1962, Ser. No. 193,362
Claims priority, application Netherlands, Nov. 17, 1961, 271,522
8 Claims. (Cl. 74—625)

This invention relates to valves, and in particular to reducing valves adapted to be operated and adjusted both manually and by power. Known reducing valves of this type, if designed for operation at pressures of the order of 200 atmospheres, have very great overall height because a cylinder for power operation is positioned in line with the valve operating rod. Another disadvantage of the known valves is that the changeover from manual to power operation, or vice versa, frequently occasions troubles and operational difficulties. In some circumstances it is impossible to make the correct adjustment after such a changeover.

The reducing valve of the present invention does not have the disadvantages referred to above, and comprises a non-rotating axially movable operating rod extending from a valve closing member to a manual operating member, which may be a handwheel. The operating rod is provided with means for transmitting force thereto from an associated power actuating device, which may be disposed laterally thereof. The operating rod end remote from the valve member is threadably engaged to a primary sleeve, which in turn is fitted into an outer sleeve, the outer sleeve being movable with respect to the primary sleeve in axial direction only. One or both sleeves is provided with a stop to limit the axial movement of the primary sleeve with respect to the outer sleeve, in direction toward the valve closing member. The outer sleeve is rotatably mounted in the valve casing, or with respect to the valve casing cover, and carries the above-mentioned operating member. Means are provided to lock the primary sleeve with respect to the outer sleeve during manual adjustment.

In this way, a principal object of the present invention is achieved, in that the overall height of the valve is considerably reduced and the mechanism for power operation can be made inoperative in simple manner, when it is desired to change over to manual operation. This is particularly true if the means for locking the sleeves with respect to one another is constituted by the abovementioned stop and a cap nut which can be threaded onto the second sleeve and is adapted to press the primary sleeve firmly against the stop.

It is also desirable, and another object of this invention, to provide means by which the primary sleeve and the operating rod can be locked with respect to one another during power operation, thereby obviating the hazard of inadvertent rotation of the handwheel, which might cause displacement of the primary sleeve with respect to the operating rod, which, in certain cases, would prevent subsequent shutting of the valve. The latter locking means may comprise a locking bolt adapted to be threadably engaged to the interior of the primary sleeve, and to be screwed firmly against the operating rod. By means of this very simple locking system, the handwheel or other manual operating means is rigidified during power operation to the degree that considerable force is required to move it, and unintentional or inadvertent rotation of the handwheel is precluded.

Preferably, in accordance with a specific object of the invention, the two locking elements, the cap nut and the locking bolt, are made integral with one another, the integral locking unit being so formed that it must be removed and installed in reverse position when a changeover is made from manual to power operation or vice versa. By this expedient, the locking unit is in use and functioning under all conditions, and neither locking element can get lost. As will be evident, this is an improvement over the common practice of attaching parts not in constant use to a chain.

In a preferred embodiment of the invention, and in accordance with another object of the invention, a power operating cylinder is mounted alongside the valve, and a lever is provided and utilized for transmitting the actuating force from the cylinder piston rod to the valve actuat-rod. So disposed, the operating cylinder takes up little space, and does not add to the overall axial length of the valve. Further, in the known valves, where the piston of the operating cylinder is coupled directly and in line to the valve body, the displacement of the cylinder piston is necessarily equal to the displacement of the valve closing member. Owing to the friction of the piston against the cylinder wall, very small adjustments are difficult to realize; the piston inherently starts moving in abrupt fashion, with the result that in many cases the adjustment effected will be larger than desired. This drawback is obviated when the lever arm through which the adjusting force is transmitted is made at least twice as long as the lever arm from the fulcrum to the point where the lever acts upon the operating rod. This favorable ratio between the lever arms affords mechanical advantage which permits the pressure of the adjusting medium active in the power actuating cylinder to be kept low and/or the diameter of the cylinder piston to be kept small. A simple and effective construction is obtained by fulcruming the lever in the valve casing. By this expedient, a mechanical advantage of 5:1 or more can easily be achieved.

The invention and the novel features thereof will be understood from the following description and the accompanying drawings, in which:

FIGURE 1a is a longitudinal section of the upper portion of the embodiment of FIGURE 1, on enlarged scale;

FIGURE 2 is a side elevational view of the valve of FIGURE 1, partly in section, showing the power operating cylinder and its connection to the valve operating rod.

Figure 1:
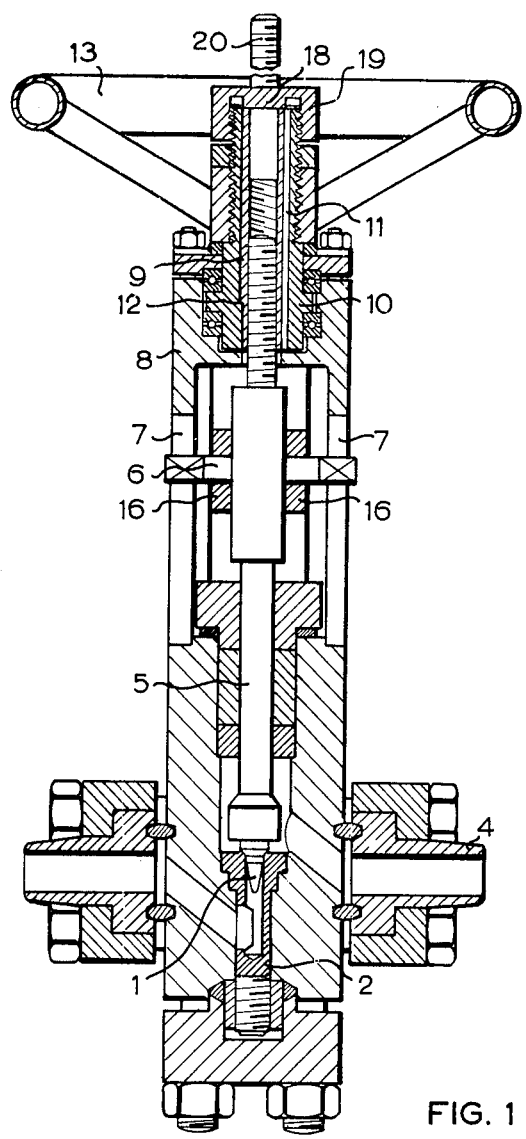
FIGURE 1 is a longitudinal section of an exemplary embodiment of the invention.
Figure 3:
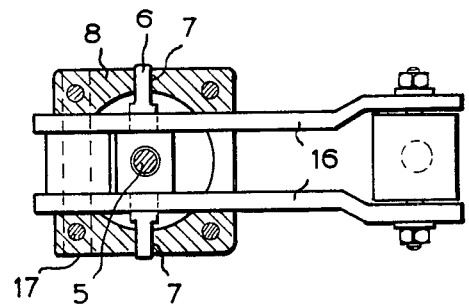
FIGURE 3 is a sectional view taken on the line A—A of FIGURE 2.

Referring to the drawings, and in particular to FIGURE 1, 1 represents a needle valve which cooperates with a valve seat 2. Passages 3 and 4 serve as inlet and outlet respectively for the fluid medium passing through the valve. The valve member 1 is attached to one end of the operating rod 5, which is slidably mounted but prevented from rotation by a guide pin 6 which extends from the operating rod outwardly through slots 7 in the casing 8. The guide pin 6 serves also to indicate the valve aperture, or the extent to which the valve is open. The other end of the actuating rod 5 is threadably engaged in a primary sleeve 9, which in turn is enclosed by an outer sleeve 10. The sleeves are longitudinally slidable with respect to each other, relative rotation therebetween being prevented by a wedge or key 11. The relative longitudinal or axial movement of the primary sleeve with respect to the outer sleeve in direction toward the needle valve member 1 is limited by the stop face 12. The outer sleeve 10 is rotatably mounted in the cover of the casing 8, and carries the handwheel 13, which is fixedly engaged thereto.

As shown in FIGURE 2, the power operating cylinder 14 is mounted alongside the valve casing in any suitable manner, and the cylinder piston rod 15 is connected to a double lever 16. The lever 16 is fulcrumed in the casing cover 8 by means of the fulcrum pin 17, and is operatively engaged to the operating rod 5 by means of the pin 6. As previously stated, the pin 6 is guided through slots 7 of the casing 8, and serves also to indicate the valve aperture. As shown in FIGURE 2, the elements of the double lever 16 may be provided with elongated holes through which the pin 6 passes, to accommodate the arcuate path of the lever.

The sleeves 9 and 10 can be locked with respect to each other by means of the unitary locking unit 18. In the embodiment illustrated, the locking unit comprises as one part thereof the cap nut 19, which is adapted to be screwed over the outer end of the outer sleeve 10, in which position it may press the primary sleeve 9 firmly against the stop 12, and maintain the sleeves immovable with respect to each other. Thereupon, upon rotation of the handwheel 13, the primary sleeve 9 moves with the outer sleeve 10, with the result that the operating rod is displaced in axial direction by screw action between the primary sleeve 9 and the rod. The other element of the locking unit comprises a locking bolt 20, which may be screwed down into the primary sleeve 9 until it contacts the end of the operating rod 5, whereby the rod can be fixed in the primary sleeve by the resultant binding action. In such case, the rod, the sleeves and the handwheel are all prevented from rotation. The operating rod with its primary sleeve and the locking unit may, in such relationship, under the influence of the power operating cylinder, be shifted in the outer sleeve 10 as an integral unit.

When the locking unit 18 is positioned as shown in FIGURE 1, with the cap nut 19 thereof engaged to the outer sleeve 10, and the valve is closed (as shown in FIGURE 1), the following steps are taken to make the valve ready for power adjustment. If the conduit in which the valve is incorporated is under pressure, pressure medium should be admitted over the piston of the adjusting cylinder 14; this causes the lever 16 to press the associated valve 1 down on the seat 2. The locking unit 18 may now be unscrewed and removed. Thereafter, the primary sleeve 9 is turned a few millimeters outwardly by means of the handwheel 13, the valve 1 remaining on its seat, thereby insuring that during power operation, the valve is pressed firmly on its seat before the primary sleeve 9 engages the stop face 12 of the outer sleeve 10. In other words, this assures that the valve can always be entirely closed during power operation. The locking unit 18 is then turned over and the locking bolt 20 thereof, which is provided with left-hand thread, is screwed firmly down into the primary sleeve 9, with the result that the operating rod 5 is engaged thereby and locked with respect to the primary sleeve 9. During power operation the handwheel 13 should never be manipulated, and this locking effect suffices to prevent rotation of the handwheel by some accidental or unintended contact.

With the parts so arranged, the piston of the power operating cylinder 14 may be piloted, and the valve may be lifted thereby over the desired distance and adjusted continuously. During power operation, the necessity may arise to change over to manual operation while the valve is in open or partly open position. In such case, the following steps should be taken. The locking unit 18 is removed by unscrewing the locking bolt 20, no precautions being required for this operation, as the valve is maintained in place by the power operating cylinder piston. By manipulation of the handwheel, the primary sleeve 9 is now screwed inwardly until its upper edge is flush with that of the secondary sleeve 10, at which position the primary sleeve 9 will engage the stop face 12. Meanwhile, the position of the valve and its operating rod 5 are unchanged. Thereafter, the locking unit 18 is positioned as shown in FIGURE 1, by screwing the cap nut 19 onto the outer sleeve 10. The power operating cylinder may now be cut out or deactivated, and the valve will remain in the last position in which it was positioned by the powered adjustment. The valve may now be operated and adjusted by hand.

If the locking unit 18 is positioned as shown in FIGURE 1 and the valve is closed (also as shown in FIGURE 1), the valve is ready for manual adjustment without any further measures being required. The pressure on the power operating cylinder must, of course, be released to permit manual adjustment.

To change from manual to power operation when the valve is open or partly open, the following steps should be taken. Initially, maximum pressure should be admitted over the cylinder piston, whereupon the lever 16 will exert downward pressure on the valve operating rod. Thereupon, the cap nut 19 may be unscrewed from the outer sleeve 10, and the locking unit 18 removed. The air or fluid pressure in the operating cylinder will maintain the primary sleeve pressed firmly against the stop face 12 of the outer sleeve, notwithstanding the force acting on the valve in opposite direction with the result that the primary sleeve will be prevented from moving outwardly. Thereafter, the difference between the pressures over and under the piston of the operating cylinder will be reduced until the primary sleeve is "floating," thereby insuring that the valve will be maintained in place by the operating cylinder. After that, the primary sleeve may be turned outwardly by means of the handwheel until it projects beyond the edge of the outer sleeve 12, the difference in height being a few millimeters more than the valve lift. The valve lift can be seen from the position of the pin 6. Then the locking unit is turned over and the locking bolt 20 thereof is screwed firmly down into the primary sleeve until it firmly binds the operating rod 5. The valve is now ready for power operation, and can be completely closed with certainty.

It will thus be seen that this invention provides structure by which the various objects hereinbefore set forth, together with many practical advantages, are successfully achieved. As various possible embodiments may be made of the novel features of this invention, all without departing from the scope thereof, it is to be understood that all matter hereinbefore set forth or shown in the accompanying drawings is to be interpreted as illustrative, and not in a limiting sense.

What is claimed is:

1. A valve actuator adapted for both manual and power operation including a casing, an operating rod mounted for axial movement in said casing, means restraining said rod from rotation with respect to said casing, a power operating device mounted laterally of said rod, means connecting said power operating device to said rod whereby the device may displace the rod in axial direction, a valve member connected to one end of said rod, a primary sleeve threadably engaged to the other end of said rod, an outer sleeve enclosing said primary sleeve and axially movable with respect thereto, means restraining said sleeves from rotation with respect to each other, means limiting the axial movement of said primary sleeve with respect to said outer sleeve in direction toward said valve member, means rotatably mounting said outer sleeve in said casing, manual operating means associated with said outer sleeve, and locking means for preventing relative axial movement between said sleeves during manual operation of the valve.

2. A valve actuator as defined in claim 1, wherein said locking means is a cap nut threadably engageable to said outer sleeve and adapted to maintain said primary sleeve firmly against its limiting means.

3. A valve actuator as defined in claim 1, including means for preventing rotation of said primary sleeve with respect to said rod during power operation of the valve.

4. A valve actuator as defined in claim 1, including a locking bolt threadably engageable to said primary sleeve and adapted to firmly engage the rod to prevent rotation of said primary sleeve with respect to said rod during power operation of the valve.

5. A valve actuator as defined in claim 1, wherein said locking means is a cap nut threadably engageable to said outer sleeve and adapted to maintain said primary sleeve firmly against its limiting means, said cap nut having integral therewith a locking bolt threadably engageable to said primary sleeve to firmly engage the rod to prevent rotation of said primary sleeve with respect to said rod, said cap nut and bolt constituting an integral unit removable and reversible upon changeover from manual to power operation and vice versa.

6. A valve actuator as defined in claim 1, wherein said power operating device is a cylinder mounted alongside the casing, the cylinder having a piston rod connected to said operating rod by means of a lever.

7. A valve actuator as defined in claim 1, wherein said power operating device is a cylinder mounted alongside the casing, the cylinder having a piston rod connected to said operating rod by means of a lever affording a mechanical advantage of at least two to one.

8. A valve actuator as defined in claim 1, wherein said power operating device is a cylinder mounted alongside the casing, the cylinder having a piston rod connected to said operating rod by means of a lever having a fulcrum mounted in the valve casing.

References Cited by the Examiner

UNITED STATES PATENTS

| | | | |
|---|---|---|---|
| 2,624,659 | 1/53 | Haug et al. | 74—625 |
| 2,885,906 | 5/59 | Cupedo | 74—625 |

BROUGHTON G. DURHAM, *Primary Examiner.*